United States Patent
Robinson (10) Patent No.: US 12,449,039 B1
(45) Date of Patent: Oct. 21, 2025

(54) BRUSH SEAL ASSEMBLY WITH METAL COVER

(71) Applicant: RTX Corporation, Farmington, CT (US)

(72) Inventor: Garrett M. Robinson, Eliot, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/770,348

(22) Filed: Jul. 11, 2024

(51) Int. Cl.
- F16J 15/32 (2016.01)
- F16J 15/3288 (2016.01)
- F01D 11/00 (2006.01)

(52) U.S. Cl.
CPC ......... F16J 15/3288 (2013.01); *F01D 11/00* (2013.01); *F05D 2240/56* (2013.01)

(58) Field of Classification Search
CPC ................................................. F16J 15/3288
See application file for complete search history.

(56) References Cited

U.S. PATENT DOCUMENTS

| | | | |
|---|---|---|---|
| 5,174,582 A * | 12/1992 | Ferguson | F16J 15/3288 277/355 |
| 5,335,920 A * | 8/1994 | Tseng | F16J 15/3288 277/303 |
| 5,568,931 A * | 10/1996 | Tseng | F16J 15/3288 415/230 |
| 6,059,526 A | 5/2000 | Mayr | |
| 9,759,077 B2 | 9/2017 | Beichl | |
| 10,024,192 B2 | 7/2018 | Schinko | |
| 10,240,472 B2 | 3/2019 | Stiehler | |
| 11,028,712 B2 | 6/2021 | Tyler | |
| 2004/0000761 A1* | 1/2004 | Addis | F16J 15/3288 277/355 |
| 2013/0171408 A1* | 7/2013 | Carlson | B32B 3/04 493/405 |
| 2015/0016957 A1* | 1/2015 | Schinko | F01D 25/28 415/9 |
| 2015/0361816 A1* | 12/2015 | Aksit | F16J 15/3288 415/174.2 |
| 2016/0003360 A1* | 1/2016 | Klaen | F16J 15/322 277/355 |
| 2020/0308972 A1* | 10/2020 | Tyler | F01D 11/005 |

* cited by examiner

*Primary Examiner* — Vishal A Patel
(74) *Attorney, Agent, or Firm* — Getz Balich LLC (57) ABSTRACT

An assembly is provided for rotational equipment. This assembly includes a brush seal and a seal cover. The brush seal extends axially along an axis from a base end to a tip end. The brush seal extends circumferentially about the axis. The brush seal includes an inner plate, an outer plate and a bristle pack disposed radially between the inner plate and the outer plate. The bristle pack is bonded to the inner plate and the outer plate at the base end. The bristle pack projects axially along the axis away from the inner plate and the outer plate to the tip end. The seal cover is mechanically attached to the outer plate.

16 Claims, 9 Drawing Sheets

BRUSH SEAL ASSEMBLY WITH METAL COVER

BACKGROUND OF THE DISCLOSURE

1. Technical Field

This disclosure relates generally to rotational equipment and, more particularly, to a brush seal assembly for the rotational equipment.

2. Background Information

Rotational equipment such as a gas turbine engine may include one or more brush seals. Various types and configurations of brush seals are known in the art. While these known brush seals have various benefits, there is still room in the art for improvement.

SUMMARY OF THE DISCLOSURE

According to an aspect of the present disclosure, an assembly is provided for rotational equipment. This assembly includes a brush seal and a seal cover. The brush seal extends axially along an axis from a base end to a tip end. The brush seal extends circumferentially about the axis. The brush seal includes an inner plate, an outer plate and a bristle pack disposed radially between the inner plate and the outer plate. The bristle pack is bonded to the inner plate and the outer plate at the base end. The bristle pack projects axially along the axis away from the inner plate and the outer plate to the tip end. The seal cover is mechanically attached to the outer plate.

According to another aspect of the present disclosure, another assembly is provided for rotational equipment. This assembly includes a brush seal and a sheet metal seal cover. The brush seal extends from a base end to a tip end. The brush seal extends circumferentially about the axis. The brush seal includes a mounting plate and a bristle pack disposed adjacent the mounting plate. The bristle pack is bonded to the mounting plate at the base end. The bristle pack projects away from the mounting plate to the tip end. The sheet metal seal cover includes a base and a plurality of tabs arranged circumferentially about the axis. Each of the tabs includes a base portion and a tip portion. The base portion projects out from the base through a respective slot in the mounting plate. The tip portion is disposed next to the mounting plate and projects out from the base portion. The tip portion is angularly offset from the base portion by a non-zero offset angle.

According to still another aspect of the present disclosure, another assembly is provided for rotational equipment. This assembly includes a brush seal and a sheet metal seal cover. The brush seal extends axially along an axis from a base end to a tip end. The brush seal extends circumferentially about the axis. The brush seal includes an inner plate, an outer plate and a bristle pack disposed radially between the inner plate and the outer plate. The bristle pack is bonded to the inner plate and the outer plate at the base end. The bristle pack projects axially along the axis away from the inner plate and the outer plate to the tip end. The sheet metal seal cover includes a base, a radial flange and an axial flange. The base projects axially along the axis out from a distal end of the outer plate. The radial flange projects radially outward from the base to the axial flange. The axial flange projects axially along the axis out from the radial flange to a distal end of the sheet metal seal cover.

The seal cover may be configured as or otherwise include a sheet metal seal cover.

The seal cover may include a tab projecting axially through a slot in the outer plate.

The seal cover may also include a base axially engaging the outer plate. The tab may project axially out from the base through the slot.

A base portion of the tab may project axially through the slot. A tip portion of the tab, axially adjacent the outer plate, may project radially outward from the base portion of the tab.

The slot may be one of a plurality of slots in the outer plate. The tab may be one of a plurality of tabs arranged circumferentially about the axis. The seal cover may also include a base. Each of the tabs may project axially out from the base through a respective one of the slots.

The seal cover may include a mount, an inner leg and an outer leg. The mount may be mechanically attached to the outer plate. The inner leg may project radially outward from the mount to the outer leg. The outer leg may project axially along the axis out from the inner leg towards the tip end.

The outer leg may project axially along the axis out from the inner leg to a distal end. The distal end may be axially recessed from the tip end.

The outer leg may be parallel with the bristle pack.

A radial height of the inner leg may be within fifty percent of an axial length of the outer leg.

A radial height of the inner leg may be equal to or less than a radial thickness of the brush seal.

An axial length of the outer leg may be equal to or less than a radial thickness of the brush seal.

The mount may include a plurality of tabs arranged circumferentially about the axis. Each of the tabs may project through a respective one of a plurality of slots in the outer plate.

The assembly may also include a second seal disposed radially outboard of the seal cover and radially engaging the seal cover.

The second seal may be configured as or otherwise include a ring seal.

The brush seal may extend at least three-hundred and forty degrees circumferentially about the axis between opposing circumferential ends of the brush seal with a brush seal gap formed by and extending circumferentially between the opposing circumferential ends of the brush seal. In addition or alternatively, the seal cover may extend at least three-hundred and forty degrees circumferentially about the axis between opposing circumferential ends of the seal cover with a cover gap formed by and extending circumferentially between the opposing circumferential ends of the seal cover.

The cover gap may be circumferentially aligned with the brush seal gap.

The bristle pack may include a plurality of first bristles and a plurality of second bristles arranged radially inboard of the plurality of first bristles. The first bristles may have a different configuration than the second bristles.

The assembly may also include a stationary first engine component and a stationary second engine component. The brush seal may axially engage the stationary first engine component at the base end. The brush seal may axially engage the stationary second engine component at the tip end. A portion of the seal cover may be captured axially between the outer plate and the stationary first engine component.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
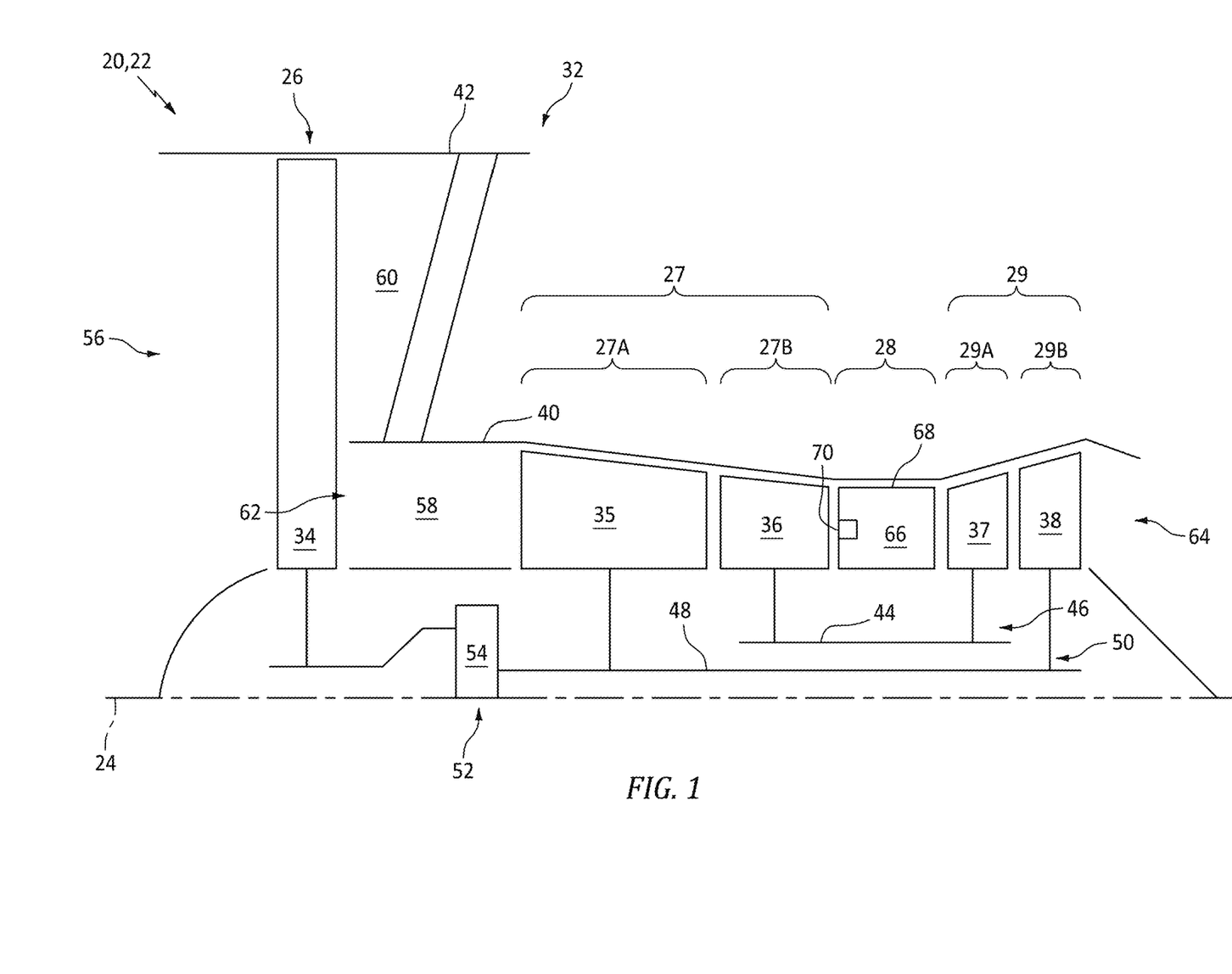
FIG. 1 is a partial schematic illustration of an aircraft powerplant.

FIG. 1 illustrates a powerplant 20 of a propulsion system for an aircraft. The aircraft may be an airplane, a drone (e.g., an unmanned aerial vehicle (UAV)), or any other manned or unmanned aerial vehicle or system. For ease of description, the aircraft propulsion system is described below as a ducted rotor propulsion system such as a turbofan propulsion system, and the aircraft powerplant 20 is described below as a gas turbine engine 22 such as a turbofan engine. The present disclosure, however, is not limited to such an exemplary aircraft propulsion system. The aircraft propulsion system, for example, may alternatively be configured as a turbojet propulsion system, a turboprop propulsion system, a turboshaft propulsion system or an open rotor propulsion system. Moreover, the present disclosure is not limited to propulsion system applications. The turbine engine 22, for example, may alternatively be configured as or included as part of an auxiliary power unit (APU) for the aircraft or a ground-based (e.g., industrial) electrical power system.

The turbine engine 22 of FIG. 1 extends axially along an axis 24 between a forward, upstream end of the turbine engine 22 and an aft, downstream end of the turbine engine 22. Briefly, the axis 24 may be a centerline axis of the turbine engine 22 and/or one or more of its members. The axis 24 may also or alternatively be a rotational axis for one or more members of the turbine engine 22. The turbine engine 22 of FIG. 1 includes a propulsor section 26 (e.g., a fan section), a compressor section 27, a combustor section 28 and a turbine section 29. The compressor section 27 includes a low pressure compressor (LPC) section 27A and a high pressure compressor (HPC) section 27B. The turbine section 29 includes a high pressure turbine (HPT) section 29A and a low pressure turbine (LPT) section 29B.

The engine sections 26-29B may be arranged sequentially along the axis 24 within a stationary engine housing 32. The propulsor section 26 includes a bladed propulsor rotor 34; e.g., a fan rotor. The LPC section 27A includes a bladed low pressure compressor (LPC) rotor 35. The HPC section 27B includes a bladed high pressure compressor (HPC) rotor 36. The HPT section 29A includes a bladed high pressure turbine (HPT) rotor 37. The LPT section 29B includes a bladed low pressure turbine (LPT) rotor 38. These engine rotors 34-38 are housed within the engine housing 32. The engine housing 32 of FIG. 1, for example, includes an inner housing structure 40 (e.g., a core case structure) and an outer housing structure 42 (e.g., a propulsor case structure). The inner housing structure 40 may house one or more of the engine sections 27A-29B and their engine rotors 35-38. The outer housing structure 42 may house at least the propulsor section 26 and its propulsor rotor 34.

The HPC rotor 36 is coupled to and rotatable with the HPT rotor 37. The HPC rotor 36 of FIG. 1, for example, is connected to the HPT rotor 37 through a high speed shaft 44. At least (or only) the HPC rotor 36, the HPT rotor 37 and the high speed shaft 44 collectively form a high speed rotating assembly 46; e.g., a high speed spool of a core of the turbine engine 22. This high speed rotating assembly 46 of FIG. 1 and its members are rotatable about the axis 24.

The LPC rotor 35 is coupled to and rotatable with the LPT rotor 38. The LPC rotor 35 of FIG. 1, for example, is connected to the LPT rotor 38 through a low speed shaft 48. At least (or only) the LPC rotor 35, the LPT rotor 38 and the low speed shaft 48 collectively form a low speed rotating assembly 50; e.g., a low speed spool of the engine core. This low speed rotating assembly 50 is further coupled to the propulsor rotor 34 through a drivetrain 52. This drivetrain 52 may be configured as a geared drivetrain, where a geartrain 54 (e.g., a transmission, a speed change device, an epicyclic geartrain, etc.) is disposed between and operatively couples the propulsor rotor 34 to the low speed rotating assembly 50 and its LPT rotor 38. With this arrangement, the propulsor rotor 34 may rotate at a different (e.g., slower) rotational velocity than the low speed rotating assembly 50 and its LPT rotor 38. However, the drivetrain 52 may alternatively be configured as a direct drive drivetrain, where the geartrain 54 is omitted. With such an arrangement, the propulsor rotor 34 rotates at a common (the same) rotational velocity as the low speed rotating assembly 50 and its LPT rotor 38. The low speed rotating assembly 50 of FIG. 1 and its members as well as the propulsor rotor 34 are rotatable about the axis 24.

During operation, ambient air from outside of the aircraft enters the aircraft powerplant 20 and its turbine engine 22 through an airflow inlet 56. This air is directed across the propulsor section 26 and into a (e.g., annular) core flowpath 58 and a (e.g., annular) bypass flowpath 60. The core flowpath 58 of FIG. 1 extends sequentially through the LPC section 27A, the HPC section 27B, the combustor section 28, the HPT section 29A and the LPT section 29B from an airflow inlet 62 into the core flowpath 58 to a combustion products exhaust 64 out from the core flowpath 58 and the engine core. The air entering the core flowpath 58 may be referred to as "core air". The bypass flowpath 60 extends through a bypass duct, which bypasses (e.g., is disposed radially outboard of and extends along) the engine core. The air within the bypass flowpath 60 may be referred to as "bypass air".

The core air is compressed by the LPC rotor 35 and the HPC rotor 36 and is directed into a (e.g., annular) combustion chamber 66 of a (e.g., annular) combustor 68 in the combustor section 28. Fuel is injected into the combustion chamber 66 by one or more fuel injectors 70 and mixed with the compressed core air to provide a fuel-air mixture. This fuel-air mixture is ignited and combustion products thereof flow through and sequentially drive rotation of the HPT rotor 37 and the LPT rotor 38 about the axis 24. The rotation of the HPT rotor 37 and the LPT rotor 38 respectively drive rotation of the HPC rotor 36 and the LPC rotor 35 about the axis 24 and, thus, compression of the air received from the core inlet 62. The rotation of the LPT rotor 38 also drives rotation of the propulsor rotor 34. The rotation of the propulsor rotor 34 propels the bypass air through and out of the bypass flowpath 60. The propulsion of the bypass air may account for a majority of thrust generated by the turbine engine 22 of FIG. 1, e.g., more than seventy-five percent (75%) of engine thrust. The turbine engine 22 of the present disclosure, however, is not limited to the foregoing exemplary thrust ratio.

Figure 2:
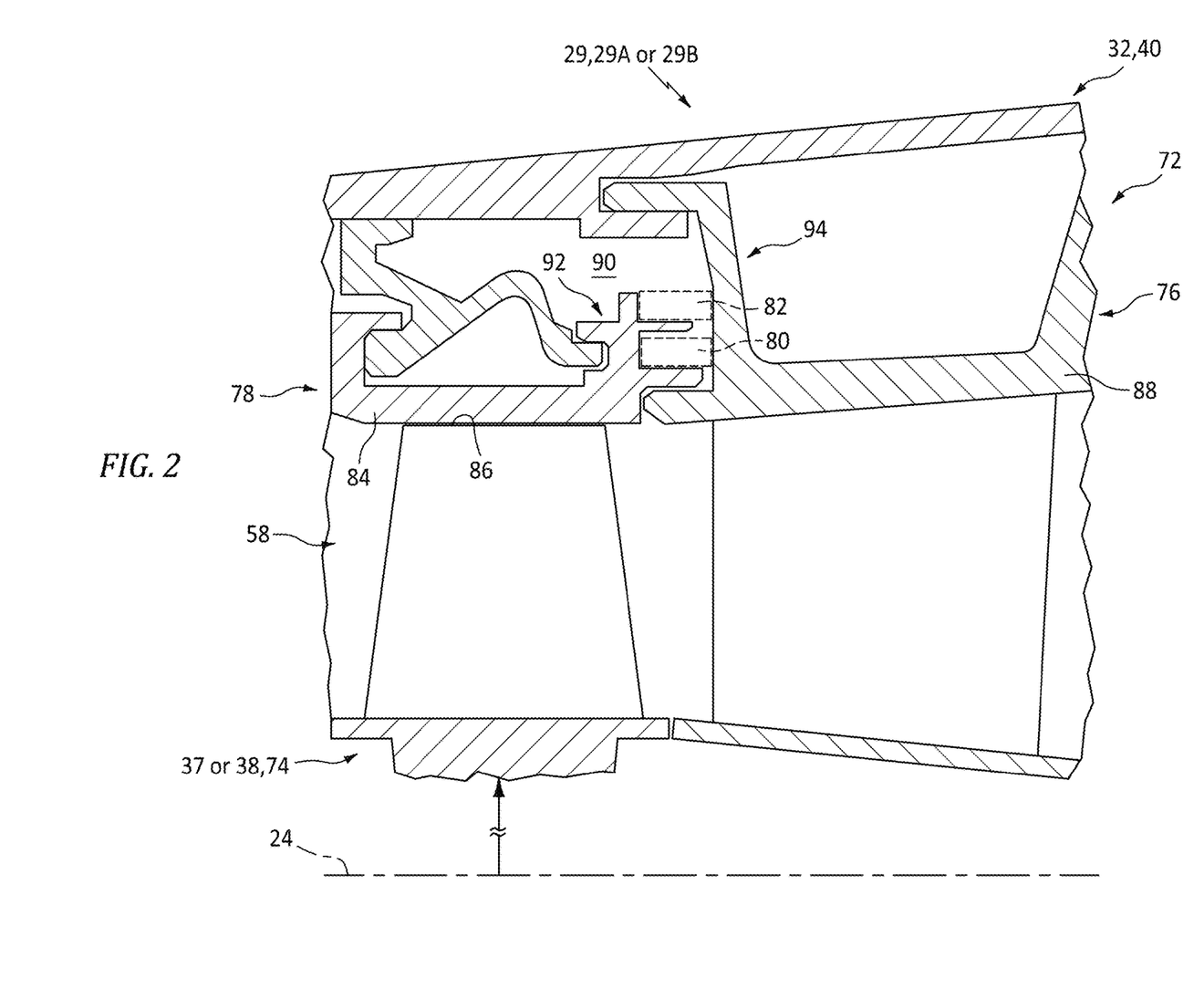
FIG. 2 is a sectional illustration of a portion of the aircraft powerplant along a core flowpath.

FIG. 2 illustrates a stationary engine structure 72 arranged with an engine rotor 74, where the engine structure 72 and the engine rotor 74 are housed within the inner housing structure 40. For ease of description, the engine structure 72 and the engine rotor 74 are described below as being located along the core flowpath 58 within the turbine section 29. The engine structure 72, for example, may extend along the core flowpath 58 within the HPT section 29A, and the engine rotor 74 may be the HPT rotor 37. In another example, the engine structure 72 may extend along the core flowpath 58 within the LPT section 29B, and the engine rotor 74 may be the LPT rotor 38. The present disclosure, however, is not limited to such exemplary arrangements within the turbine section 29. Moreover, it is contemplated the engine structure 72 may alternatively extend along the core flowpath 58 within the compressor section 27 (see FIG. 1), and the engine rotor 74 may alternatively be one of the compressor rotors 35, 36 (see FIG. 1).

The engine structure 72 of FIG. 2 includes a turbine vane structure 76, a blade outer air seal 78 ("BOAS"; sometimes also referred to as an "outer shroud"), a brush seal assembly 80 and a ring seal 82. The vane structure 76 of FIG. 2 is disposed next to and may be downstream of the engine rotor 74 along the core flowpath 58. A tubular flowpath wall 84 of the blade outer air seal 78 is disposed next to and radially outboard of rotor blade tips 86 of the engine rotor 74. The blade outer air seal 78 and its flowpath wall 84 axially overlap and circumscribe the engine rotor 74 and its rotor blade tips 86. The blade outer air seal 78 and its flowpath wall 84 are disposed next to and may be upstream of a tubular outer platform 88 of the vane structure 76 along the core flowpath 58. With this arrangement, the flowpath wall 84 and the outer platform 88 form a radial outer peripheral boundary of a longitudinal section of the core flowpath 58. The flowpath wall 84 and the outer platform 88 also provide a barrier between the core flowpath 58 and a cooling air volume 90 (e.g., passage, plenum, etc.) radially outboard of the core flowpath 58. The brush seal assembly 80 and the ring seal 82 are configured axially between the blade outer air seal 78 and the vane structure 76 to reduce or prevent fluid leakage (e.g., cooling air leakage) radially across the engine structure 72 from the cooling air volume 90 into the core flowpath 58. The brush seal assembly 80 and the ring seal 82 of FIG. 2, for example, each engage (e.g., contact), extend axially between and seal an axial gap between a (e.g., downstream) mounting structure 92 of the blade outer air seal 78 and a (e.g., upstream) mounting structure 94 of the vane structure 76. In the arrangement of FIG. 2, the brush seal assembly 80 is located radially outboard of the flowpath wall 84 and the outer platform 88. The ring seal 82 is located next to and radially outboard the brush seal assembly 80.

Figure 3:
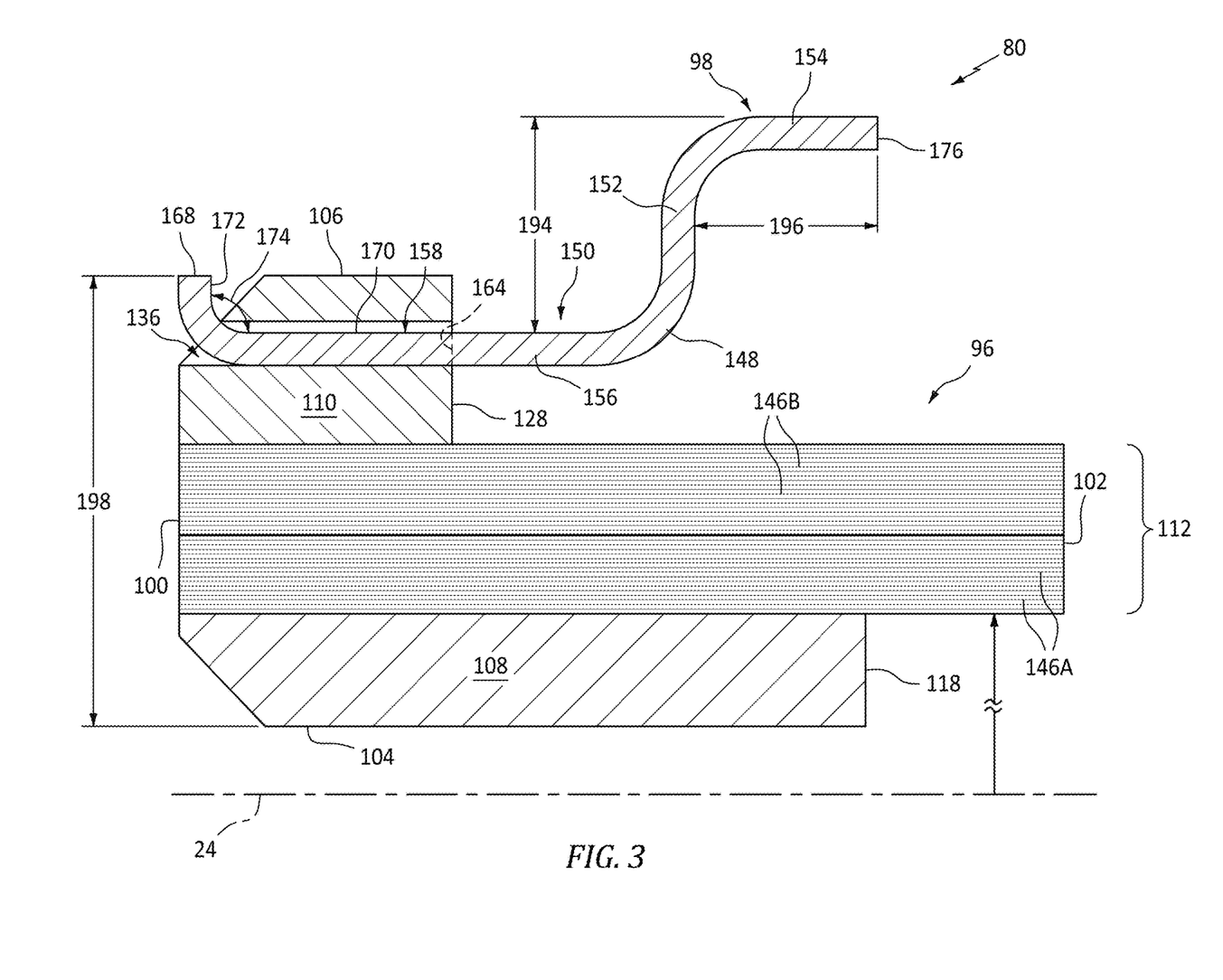
FIG. 3 is a partial sectional illustration of a brush seal assembly.

Referring to FIG. 3, the brush seal assembly 80 includes a brush seal 96 and a brush seal cover 98. Briefly, the brush seal cover 98 may be configured as a windage cover for the brush seal 96. The brush seal cover 98 may also be configured to protect the brush seal 96 from damage resulting from high velocity cooling air.

Figure 4:
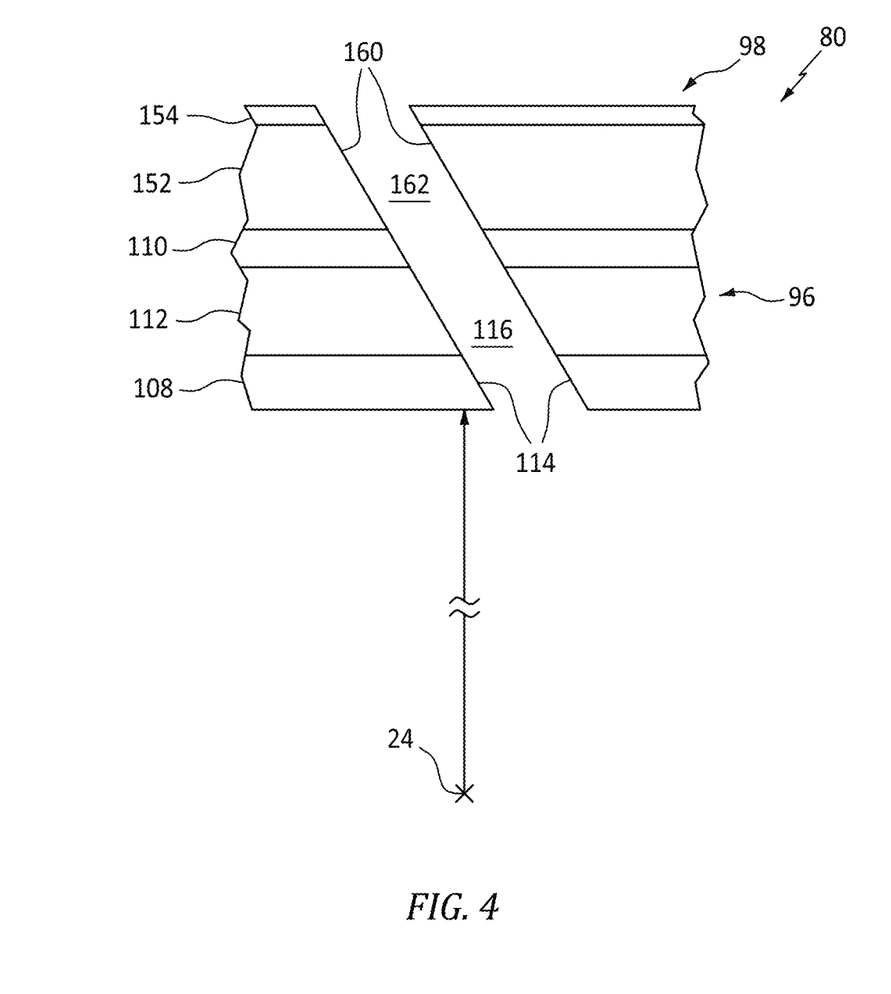
FIG. 4 is a partial illustration of the brush seal assembly at a brush seal gap.

The brush seal 96 extends axially along the axis 24 from a base end 100 of the brush seal 96 to a tip end 102 of the brush seal 96. The brush seal 96 extends radially from a radial inner side 104 of the brush seal 96 to a radial outer side 106 of the brush seal 96. The brush seal 96 of FIG. 3 includes a radial inner plate 108 (e.g., a back plate), a radial outer plate 110 (e.g., a front plate) and a bristle pack 112. The brush seal 96 and each of its members 108, 110 and 112 extend circumferentially about the axis 24, providing the brush seal 96 and each of its members 108, 110 and 112 with a substantially full-hoop (e.g., annular) geometry. The brush seal 96 and each of its members 108, 110 and 112, for example, may extend continuously, uninterrupted at least three-hundred and forty degrees (340°) or three-hundred and fifty degrees (350°) about the axis 24 between circumferentially opposing ends 114 of the brush seal 96 (see FIG. 4). Referring to FIG. 4, the seal ends 114 are circumferentially spaced apart by a brush seal gap 116. This seal gap 116 extends radially and axially through the brush seal 96 thereby providing the brush seal 96 with a circumferentially split ring geometry; e.g., a piston ring-type geometry.

Figure 5:
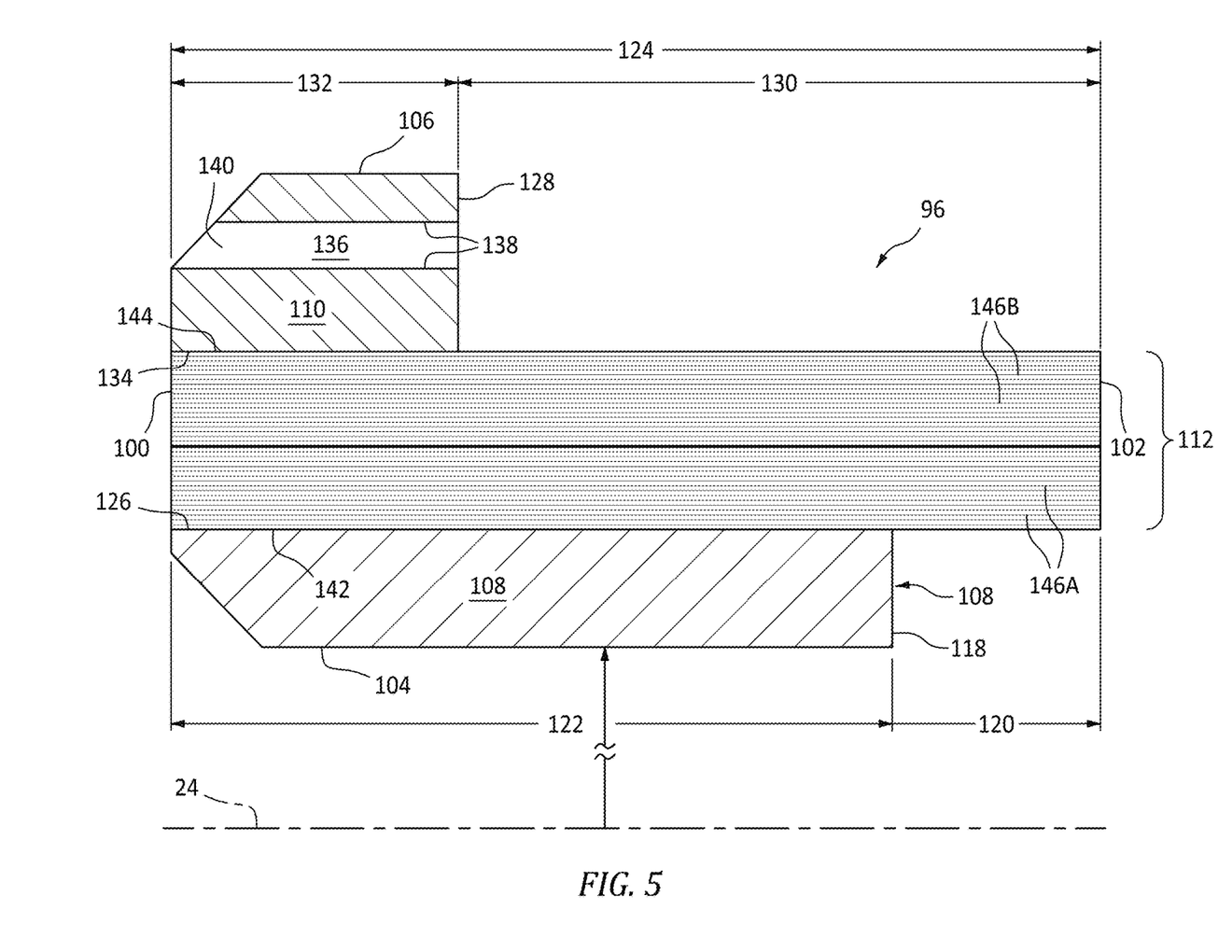
FIG. 5 is a partial sectional illustration of a brush seal.

Referring to FIG. 5, the inner plate 108 extends axially along the axis 24 in an axial first direction (e.g., away from the seal base end 100/towards the seal tip end 102) from (or about) the seal base end 100 to a distal end 118 of the inner plate 108. This inner plate distal end 118 is axially recessed from the seal tip end 102 by a non-zero axial distance 120. The inner plate 108 thereby has an axial length 122 which is less than an axial length 124 of the brush seal 96. The inner plate 108 is disposed at (e.g., on, adjacent or proximate) the seal inner side 104. The inner plate 108 of FIG. 5, for example, extends radially between and to the seal inner side 104 and a radial outer side 126 of the inner plate 108. The inner plate 108 of FIG. 5 is constructed from metal.

The outer plate 110 extends axially along the axis 24 in the first direction from (or about) the seal base end 100 to a distal end 128 of the outer plate 110. This outer plate distal end 128 is axially recessed from the seal tip end 102 by a non-zero axial distance 130 which may be greater than the axial distance 120. The outer plate 110 thereby has an axial length 132 which is less than the axial length 124 of the brush seal 96. The outer plate axial length 132 may also be less than the inner plate axial length 122. The outer plate 110 is disposed at the seal outer side 106. The outer plate 110 of FIG. 5, for example, extends radially between and to the seal outer side 106 and a radial inner side 134 of the outer plate 110. The outer plate 110 of FIG. 5 is constructed from metal.

The outer plate 110 of FIG. 5 is configured with one or more slots 136. These slots 136 are arranged circumferentially about the axis 24 in an annular array; see also FIG. 7. Each slot 136 projects axially through the outer plate 110. Each slot 136 extends radially within the outer plate 110 between opposing radial sides 138 of the respective slot 136. Each slot 136 extends laterally (e.g., circumferentially or tangentially) within the outer plate 110 between laterally opposing sides 140 of the respective slot 136 (one visible in FIG. 5).

The bristle pack 112 extends axially along the axis 24 in the first direction from (or about) the seal base end 100 to the seal tip end 102. The bristle pack 112 may thereby have an axial length which is equal to (or slightly less than) the axial length 124 of the brush seal 96. The bristle pack 112 is disposed radially between the inner plate 108 and the outer plate 110. The bristle pack 112 of FIG. 5, for example, extends radially between and to a radial inner side 142 of the bristle pack 112 and a radial outer side 144 of the bristle pack 112. The bristle pack inner side 142 may be engaged with (e.g., radially abutted against) the inner plate outer side 126. The bristle pack outer side 144 may be engaged with (e.g., radially abutted against) the outer plate inner side 134.

The bristle pack 112 is formed from a dense array of brush seal bristles 146A and 146B (generally referred to as "146"). Each of these bristles 146 may extend longitudinally generally in the first direction from (or about) the seal base end 100 to the seal tip end 102. Note, a trajectory of a longitudinal extent of each bristle 146 may only include an axial component. Alternatively, the trajectory of the longitudinal extent of one, some or all of the bristles 146 may also include a circumferential component, for example, to reduce likelihood of bristle buckling.

Figure 6:
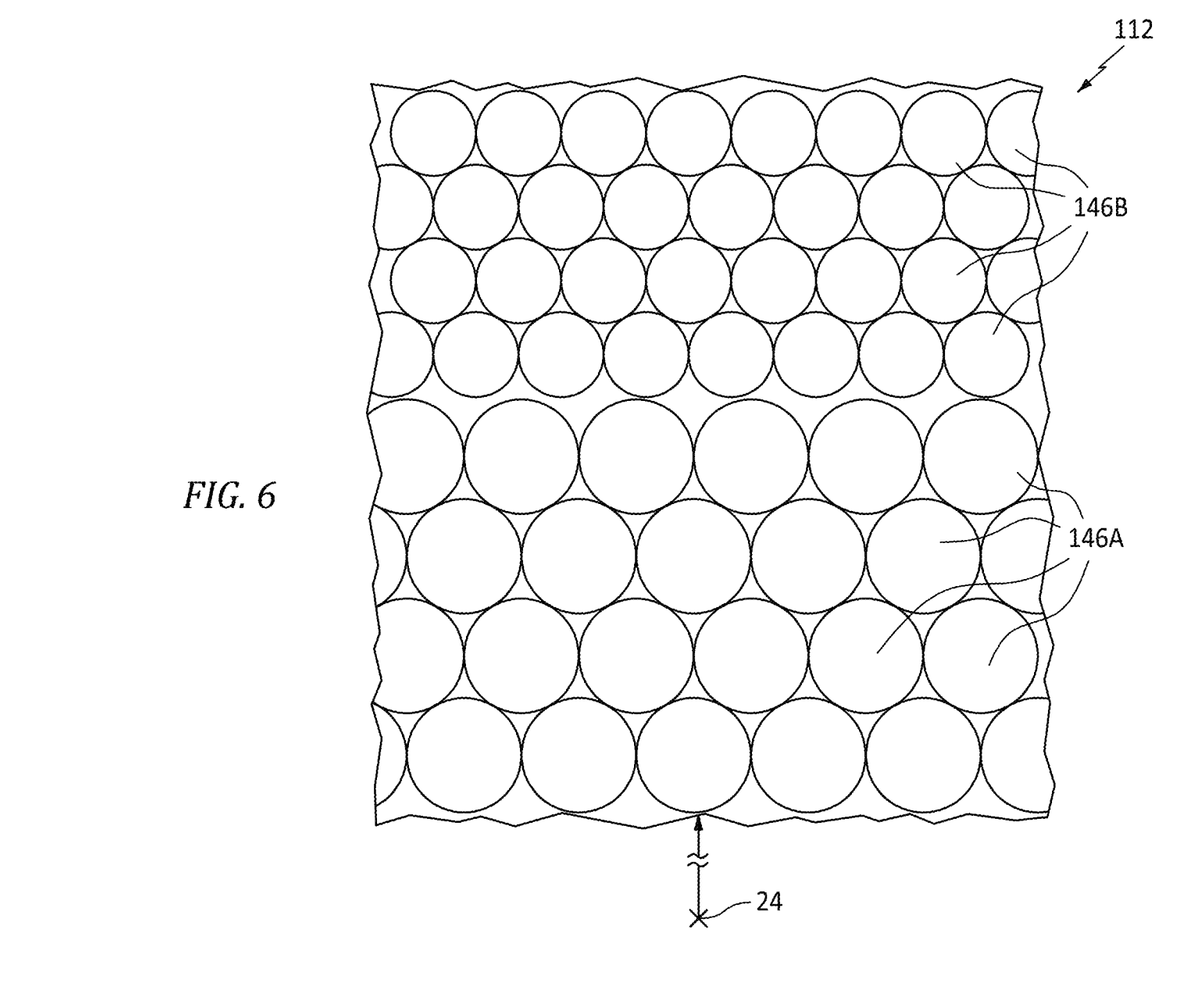
FIG. 6 is an end view illustration of a portion of a bristle pack.

The bristles 146 may be arranged into an inner set of bristles 146A and an outer set of bristles 146B, where the inner set of bristles 146A are located radially inboard of the outer set of bristles 146B. Referring to FIG. 6, the inner set of the bristles 146A may be configured with a different configuration than the outer set of bristles 146B. A diameter of each bristle 146A in the inner set of bristles 146A of FIG. 6, for example, is larger than a diameter of each bristle 146B in the outer set of bristles 146B. The present disclosure, however, is not limited to such an exemplary bristle pack arrangement. Moreover, in other embodiments, all of the bristles 146 included in the bristle pack 112 may have a common (the same) configuration. Each of the bristles 146 of FIG. 6 is constructed from metal; e.g., each bristle may be a metal wire or a metal filament.

Referring to FIG. 5, the bristle pack 112 is bonded to the inner plate 108 and the outer plate 110. The bristle pack 112 and each of its bristles 146, for example, may be welded to the inner plate 108 and the outer plate 110 at the seal base end 100. With this arrangement, the bristle pack 112 and its bristles 146 are fixed to the inner plate 108 and the outer plate 110 at the seal base end 100. However, the bristle pack 112 and its bristles 146 are loose (e.g., unrestricted) at the seal tip end 102.

Referring to FIG. 3, the seal cover 98 may be formed from a piece of sheet metal 148. This sheet metal 148 may be configured (e.g., cut, shaped, etc.) to provide the seal cover 98 with a cover mount 150, an offset flange 152 and a locator flange 154. The cover mount 150 includes a mount base 156 and one or more mount tabs 158. The seal cover 98 and each of its members 150, 152, 154 and 156 extend circumferentially about the axis 24, providing the seal cover 98 and each of its members 150, 152, 154 and 156 with a substantially full-hoop (e.g., annular) geometry. The seal cover 98 and each of its members 150, 152, 154 and 156, for example, may extend continuously, uninterrupted at least three-hundred and forty degrees (340°) or three-hundred and fifty degrees (350°) about the axis 24 between circumferentially opposing ends 160 of the seal cover 98 (see FIG. 4). Referring to FIG. 4, the cover ends 160 are circumferentially spaced apart by a seal cover gap 162. This cover gap 162 extends radially and axially through the seal cover 98 thereby providing the seal cover 98 with a circumferentially split ring geometry; e.g., a piston ring-type geometry.

Referring to FIG. 3, the mount base 156 extends axially along the axis 24 in the first direction from an axial end 164 of the mount base 156 to a radial inner end of the offset flange 152. This mount base 156 may be substantially (e.g., within two degrees, or five degrees) or completely parallel with the axis 24 and/or the bristle pack 112 when viewed, for example, in a reference plane parallel to (e.g., including) the axis 24.

Figure 7:
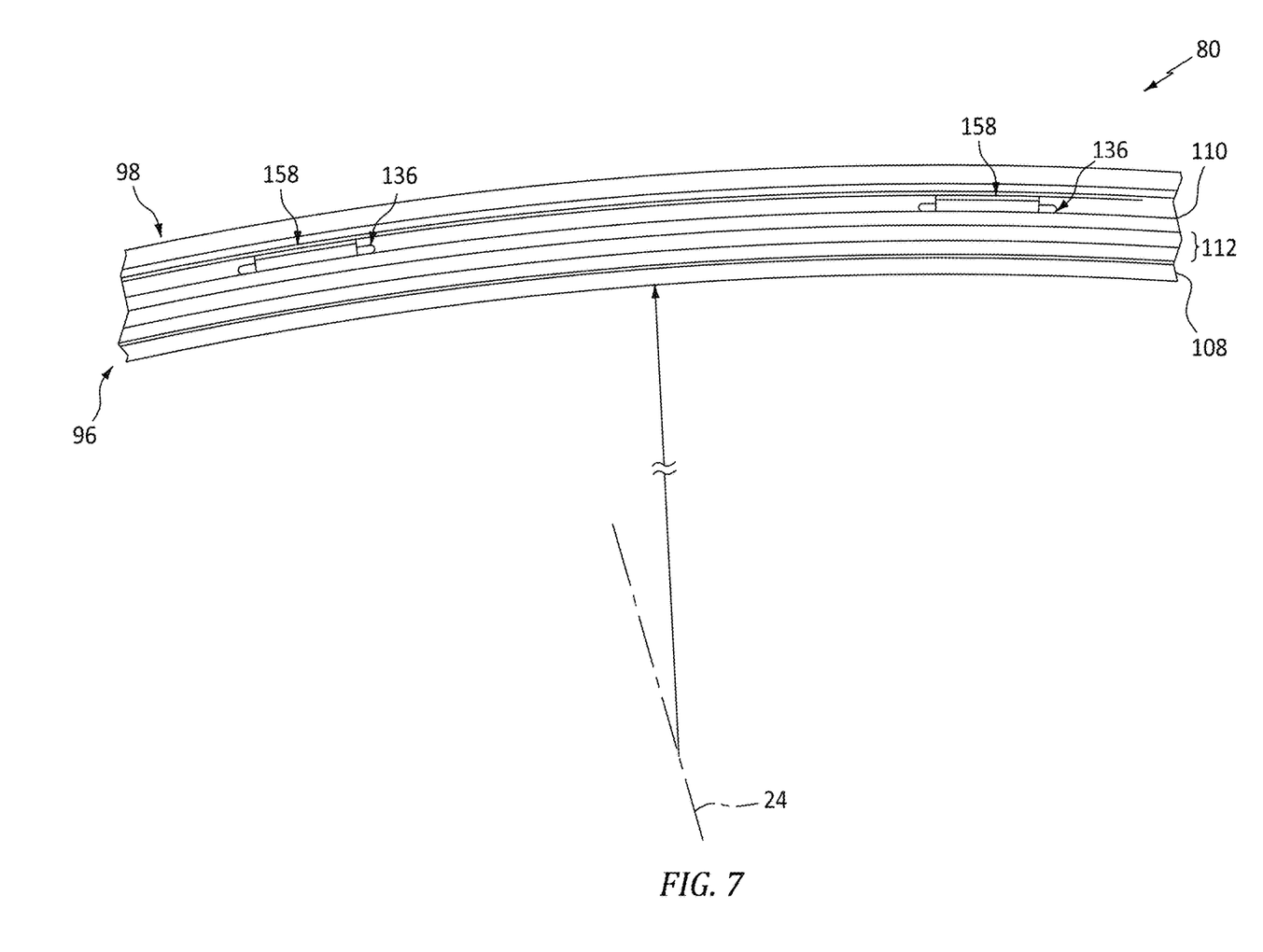
FIG. 7 is a partial perspective illustration of the brush seal assembly.
Figure 8:
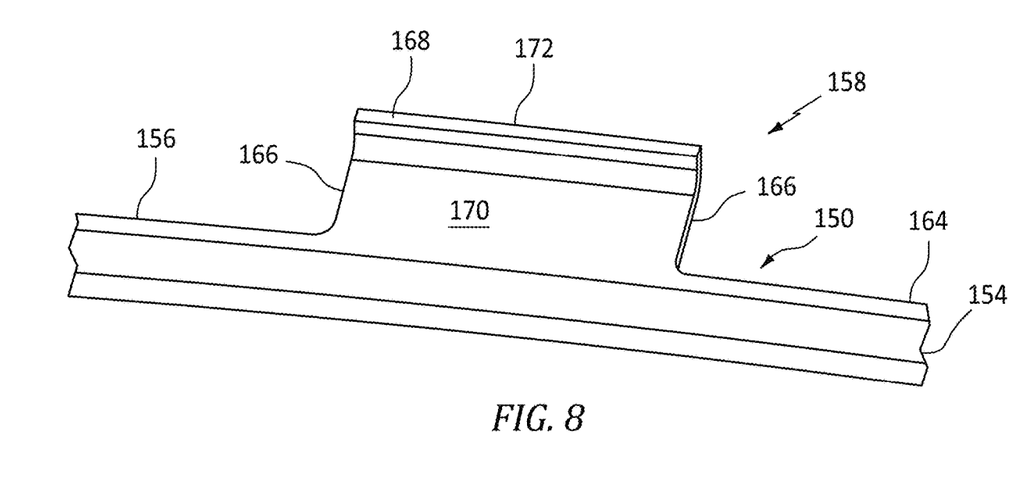
FIG. 8 is a partial perspective illustration of a brush seal cover at a mount tab following installation, where brush seal is not illustrated in FIG. 8 for clarity of illustration.
Figure 9:
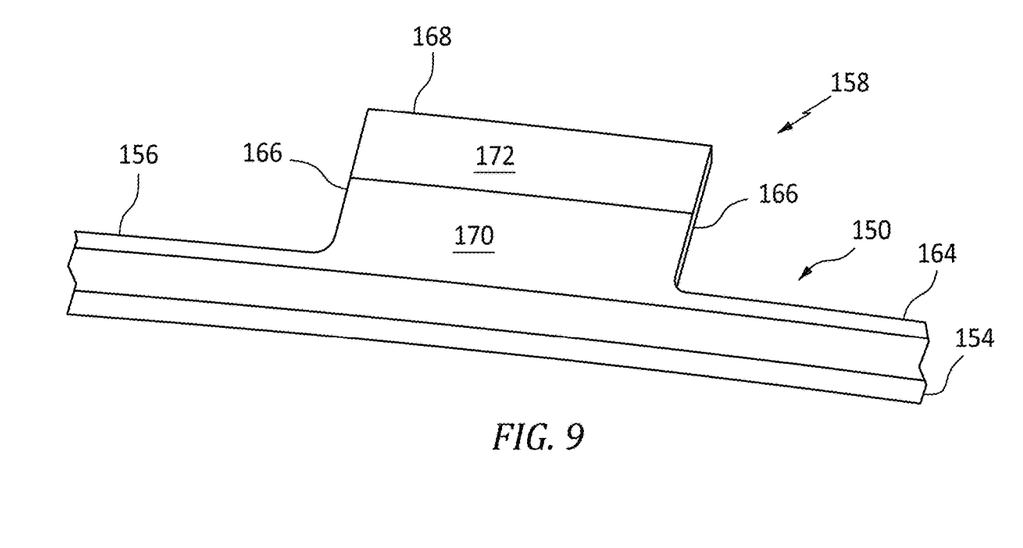
FIG. 9 is a partial perspective illustration of a brush seal cover at the mount tab prior to installation.

Referring to FIG. 7, the mount tabs 158 are arranged and may be equispaced circumferentially about the axis 24 in an annular array. Referring to FIG. 8, each mount tab 158 extends laterally (e.g., circumferentially or tangentially) between opposing lateral sides 166 of the respective mount tab 158. Each mount tab 158 projects out from the mount base 156 at its base axial end 164 to a distal end 168 of the respective mount tab 158. Referring to FIG. 9, prior to installation of the seal cover 98 with the brush seal 96 (see FIG. 3), each mount tab 158 may have a flat geometry. However, referring to FIG. 8, following installation of the seal cover 98 with the brush seal 96 (see FIG. 3), each mount tab 158 may have a bent (e.g., hooked) geometry. Note, FIG. 8 is shown without the brush seal 96 for clarity of illustration. Each mount tab 158 of FIG. 8 is configured with a base portion 170 and a tip portion 172. The base portion 170 of FIG. 3 projects axially along the axis 24 out from the mount base 156 at its base axial end 164 to a radial inner end of the tip portion 172. This base portion 170 may be substantially or completely parallel with the axis 24, the bristle pack 112 and/or the mount base 156 when viewed, for example, in the reference plane. The tip portion 172 of FIG. 3 projects radially out from an axial end of the base portion 170 to a radial outer distal end of the respective mount tab 158 and its tip portion 172—the mount tab distal end 168. This mount tab distal end 168 may be formed by a segmented (e.g., castellated) first edge of the sheet metal 148 forming the seal cover 98. The tip portion 172 of FIG. 3 is angularly offset from the base portion 170 by a non-zero offset angle 174 when viewed, for example, in the reference plane. This offset angle 174 may be a right (90°) angle, an acute angle (e.g., equal to or greater than 45° or 60°, and less than 90°), or an obtuse angle (e.g., equal to or less than 135° or 120°, and greater than 90°).

The offset flange 152 may be configured as a radial, inner leg of material; e.g., compared to the locator flange 154. The offset flange 152 of FIG. 3, for example, projects radially outward (e.g., away from the axis 24) from an axial end of the cover mount 150 and its mount base 156 to an axial end of the locator flange 154.

The locator flange 154 may be configured as an axial, outer leg of material; e.g., compared to the offset flange 152. The locator flange 154 of FIG. 3, for example, projects axially along the axis 24 in the first direction out from a radial outer end of the offset flange 152 to an axial distal end 176 of the locator flange 154. This locator flange distal end 176 may be formed by a second edge of the sheet metal 148. This locator flange 154 of FIG. 3 may be substantially or completely parallel with the axis 24, the bristle pack 112 and/or the cover mount 150 and its members 156 and 170 when viewed, for example, in the reference plane.

The seal cover 98 is mounted with the brush seal 96. Prior to and during an initial start of a mounting process, each of the mount tabs 158 has its flat geometry as shown, for example, in FIG. 9. Each mount tab 158 may thereby be inserted into a respective one of the slots 136 in the outer plate 110. The seal cover 98 may then be moved (e.g., translated) axially relative to the brush seal 96 such that each tip portion 172 projects out of the respective slot 136. Here, the axial end 164 of the mount base 156 may axially engage (e.g., contact, abut against) the outer plate distal end 128 as shown, for example, in FIG. 3. Each tip portion 172 may then be bent outward away from the axis 24 to provide the offset angle 174. With this arrangement, the outer plate 110 is captured axially between the mount base 156 and the bent tip portions 172. The cover mount 150 may thereby be mechanically attached to the brush seal 96 and, more particularly, its outer plate 110 through tab-and-slot mechanical connections. Note, the seal cover 98 of FIG. 3 is attached to the brush seal 96 through the outer plate 110 without, for example, engaging any other member of the brush seal 96.

Figure 10:
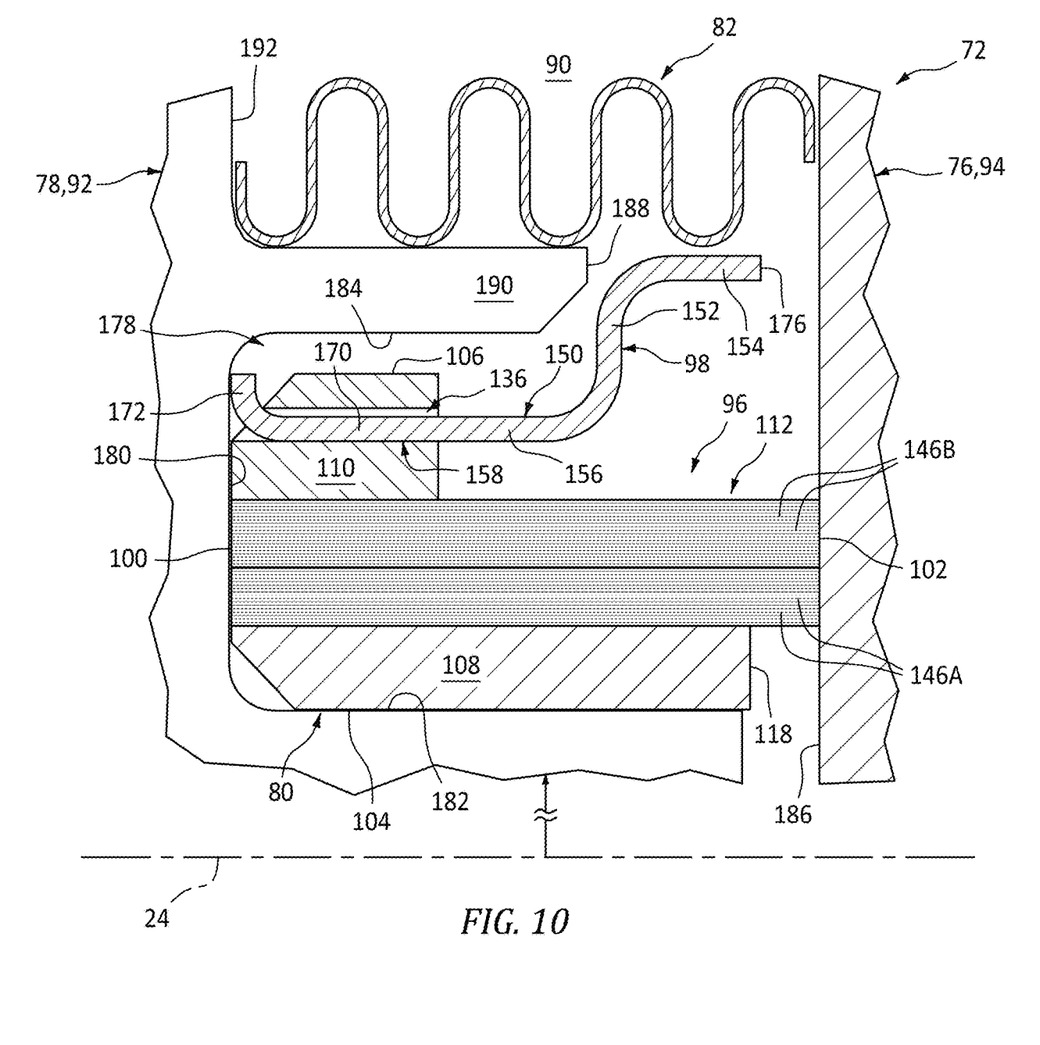
FIG. 10 is a partial sectional illustration at a seal interface between adjacent stationary engine structures.

Referring to FIG. 10, the brush seal assembly 80 is arranged axially between and retained with the blade outer air seal 78 and the vane structure 76. The brush seal assembly 80 of FIG. 10, for example, is seated within a channel 178 in the mounting structure 92 of the blade outer air seal 78. This channel 178 projects axially along the axis 24 in the second direction into the mounting structure 92 of the blade outer air seal 78 to an end 180 of the channel 178. The channel 178 extends radially within the mounting structure 92 of the blade outer air seal 78 between and to opposing radial sides 182 and 184 of the channel 178. Within the channel 178, the brush seal 96 and its inner plate 108 may radially engage (e.g., contact, lay against) the channel inner side 182. The brush seal 96 and one or more of its members 108, 110 and 112 may axially engage the channel end 180 at the seal base end 100. The seal cover 98 and its members 158 and 172 are captured axially between the channel end 180 and the outer plate 110 at the seal base end 100. The seal cover 98 and its members 158 and 172 may also axially engage the channel end 180. Here, the seal cover 98 and its cover mount 150 are radially spaced from the channel outer side 184 by a radial gap; e.g., an air gap. The bristle pack 112 and its bristles 146 axially engage (e.g., contact and pressed against/are biased axially against) a radially extending seal land 186 on the mounting structure 94 of the vane structure 76. With this arrangement, the brush seal assembly 80 may provide a seal interface between the mounting structure 92 of the blade outer air seal 78 and the mounting structure 94 of the vane structure 76.

In addition to facilitating provision of the seal interface as described above, the seal cover 98 may also locate and/or support a portion of the ring seal 82 axially between the blade outer air seal 78 and the vane structure 76. The locator flange 154 of FIG. 10, for example, is disposed in an axial gap formed by and extending axially between (a) an axial distal end 188 of a flange 190 of the blade outer air seal mounting structure 92 and (b) the seal land 186. Here, the mounting structure flange 190 is radially outboard of the channel 178 and forms the channel outer side 184. With the foregoing arrangement, the locator flange 154 substantially bridges the axial gap and provides an axial extension for the mounting structure flange 190. The ring seal 82 is disposed radially outboard of the mounting structure flange 190 and the locator flange 154. The ring seal 82 may radially engage the mounting structure flange 190 and the locator flange 154 as the ring seal 82 extends axially along the axis 24 between and is biased (e.g., compressed) between a seal land 192 of the blade outer air seal mounting structure 92 and the seal land 186. With this arrangement, the ring seal 82 may provide an additional seal interface between the mounting structure 92 of the blade outer air seal 78 and the mounting structure 94 of the vane structure 76.

Examples of the ring seal 82 include, but are not limited to, an annular W-seal element, an annular C-seal element, an S-seal element, a dog bone seal element, a rope seal element or the like. The ring seal 82 of FIG. 10 is constructed from metal or another heat resistant material. The present disclosure, however, is not limited to such exemplary ring seal configurations.

As described above, the seal cover 98 is a discretely formed element from the brush seal 96. With this arrangement, the brush seal 96 may be assembled and its members 108, 110 and 112 may be welded together without altering a geometry of the seal cover 98. Note, during a typical brush seal assembly process, one or more of the plates 108, 110 may (e.g., slightly) shift and/or thermally deform while being welded or otherwise bonded to the bristle pack 112. Such shifting and/or thermal deformation may change clearances between the respective plate(s) 108, 110 and the stationary engine structures 92, 94. However, since the brush seal 96 is mated with the seal cover 98 after assembly of the brush seal 96 (e.g., the welding of the brush seal members 108, 110 and 112 together), the assembly of the brush seal 96 does not alter a geometry of the seal cover 98. The seal cover 98 may thereby be precisely manufactured to provide specified tolerances between, for example, the locator flange 154 and the axially adjacent member(s) 186 and 190.

In some embodiments, referring to FIG. 4, the brush seal 96 and the seal cover 98 may be circumferentially clocked about the axis 24 such that the seal gap 116 is circumferentially aligned with the cover gap 162.

Referring to FIG. 3, the offset flange 152 has a radial height 194 and the locator flange 154 has an axial length 196. In some embodiments, the radial height 194 may be sized within plus or minus fifty percent (+/−50%) or twenty-five percent (+/−25%) of the axial length 196. The radial height 194 may be equal to or less than a radial thickness 198 of the brush seal 96. The axial length 196 may be equal to or less than the radial thickness 198. The present disclosure, however, is not limited to such exemplary dimensional relationships.

While the brush seal assembly 80 is described above with respect to a turbine engine powerplant, the present disclosure is not limited to such an exemplary application. It is contemplated, for example, the brush seal assembly 80 may alternatively be configured with various other types of engines and powerplants. Moreover, it is contemplated the brush seal assembly 80 may alternatively be configured with various other types of rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
   a brush seal extending axially along an axis from a base end to a tip end, the brush seal extending circumferentially about the axis, the brush seal including an inner plate, an outer plate and a bristle pack disposed radially between the inner plate and the outer plate, the outer plate comprising a first slot and a second slot, the bristle pack bonded to the inner plate and the outer plate at the base end, and the bristle pack projecting axially along the axis away from the inner plate and the outer plate to the tip end; and
   a seal cover mechanically attached to the outer plate, the seal cover comprising a first tab and a second tab;

a base portion of the first tab projecting axially through the first slot, and a tip portion of the first tab, axially adjacent the outer plate, projecting radially outward from the base portion of the first tab; and a base portion of the second tab projecting axially through the second slot, and a tip portion of the second tab, axially adjacent the outer plate, projecting radially outward from the base portion of the second tab.

2. The assembly of claim 1, wherein the seal cover comprises a sheet metal seal cover.

3. The assembly of claim 1, wherein
the seal cover further comprises a base axially engaging the outer plate;
the base portion of the first tab projects axially out from the base through the first slot; and
the base portion of the second tab projects axially out from the base through the second slot.

4. The assembly of claim 1, wherein
the outer plate comprises a plurality of slots including the first slot and the second slot;
the seal cover comprises a plurality of tabs including the first tab and the second tab, and the plurality of tabs are arranged circumferentially about the axis; and
the seal cover further comprises a base, and each of the plurality of tabs projects axially out from the base through a respective one of the plurality of slots.

5. The assembly of claim 1, wherein
the seal cover includes a mount, an inner leg and an outer leg;
the mount is mechanically attached to the outer plate and includes the first tab and the second tab;
the inner leg projects radially outward from the mount to the outer leg; and
the outer leg projects axially along the axis out from the inner leg towards the tip end.

6. The assembly of claim 5, wherein
the outer leg projects axially along the axis out from the inner leg to a distal end; and
the distal end is axially recessed from the tip end.

7. The assembly of claim 5, wherein the outer leg is parallel with the bristle pack.

8. The assembly of claim 5, wherein a radial height of the inner leg is within fifty percent of an axial length of the outer leg.

9. The assembly of claim 5, wherein a radial height of the inner leg is equal to or less than a radial thickness of the brush seal.

10. The assembly of claim 5, wherein an axial length of the outer leg is equal to or less than a radial thickness of the brush seal.

11. The assembly of claim 1, further comprising a second seal disposed radially outboard of the seal cover and radially engaging the seal cover.

12. The assembly of claim 1, wherein at least one of
the brush seal extends at least three-hundred and forty degrees circumferentially about the axis between opposing circumferential ends of the brush seal with a brush seal gap formed by and extending circumferentially between the opposing circumferential ends of the brush seal; or
the seal cover extends at least three-hundred and forty degrees circumferentially about the axis between opposing circumferential ends of the seal cover with a cover gap formed by and extending circumferentially between the opposing circumferential ends of the seal cover.

13. The assembly of claim 12, wherein the cover gap is circumferentially aligned with the brush seal gap.

14. The assembly of claim 1, wherein
the bristle pack comprises a plurality of first bristles and a plurality of second bristles arranged radially inboard of the plurality of first bristles; and
the plurality of first bristles have a different configuration than the plurality of second bristles.

15. The assembly of claim 1, further comprising:
a stationary first engine component; and
a stationary second engine component;
the brush seal axially engaging the stationary first engine component at the base end, and the brush seal axially engaging the stationary second engine component at the tip end; and
a portion of the seal cover captured axially between the outer plate and the stationary first engine component.

16. An assembly for rotational equipment, comprising:
a brush seal extending from a base end to a tip end, the brush seal extending circumferentially about an axis, the brush seal including a mounting plate and a bristle pack disposed adjacent the mounting plate, the bristle pack bonded to the mounting plate at the base end, and the bristle pack projecting away from the mounting plate to the tip end; and
a sheet metal seal cover including a base and a plurality of tabs arranged circumferentially about the axis, each of the plurality of tabs including a base portion and a tip portion, the base portion projecting out from the base through a respective slot in the mounting plate, and the tip portion disposed next to the mounting plate and projecting out from the base portion, wherein the tip portion is angularly offset from the base portion radial outward by a non-zero offset angle.

* * * * *